D. E. ROSS.
STEERING GEAR.
APPLICATION FILED JULY 21, 1913.

1,157,123.

Patented Oct. 19, 1915.
2 SHEETS—SHEET 1.

Witnesses
Fenton S. Belt
Donald N. Rich

Inventor
David E. Ross
By Dowell & Dowell
Attorneys

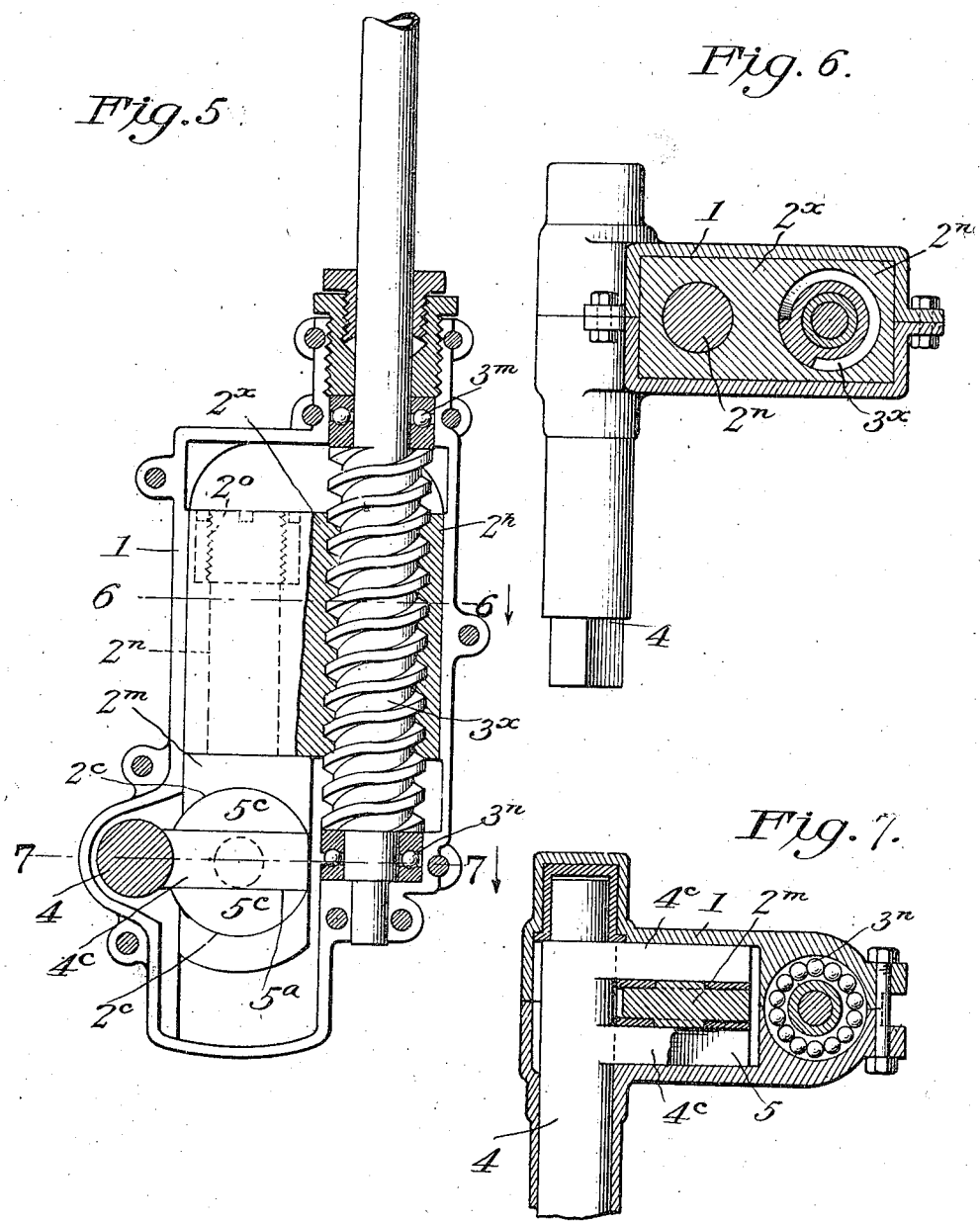

UNITED STATES PATENT OFFICE.

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING-GEAR.

1,157,123.

Specification of Letters Patent.   Patented Oct. 19, 1915.

Application filed July 21, 1913.   Serial No. 780,258.

*To all whom it may concern:*

Be it known that I, DAVID E. Ross, a citizen of the United States, residing at La Fayette, in the county of Tippecanoe and State of Indiana, have invented certain new and useful Improvements in Steering-Gears; and I hereby declare that the following is a full, clear, and exact description thereof, reference being had to the accompanying drawings, which form part of this specification.

This invention relates to steering gears for automobiles and the like wherein it is desired to actuate the steering crank very powerfully and yet easily from the steering wheel and hold the steering crank positively in any position to which it may be adjusted.

The invention comprises novel means for producing a rocking motion of one member by longitudinal movement of an actuating member, and whereby slippage due to angular motion of the rocking member relative to the actuating member is compensated for.

The invention is capable of embodiment in various forms so far as the construction of the parts and the housing thereof is concerned; provided the essential feature of the invention, *i. e.* the novel means for compensating for slippage due to angular motion, is retained.

Figure 1:
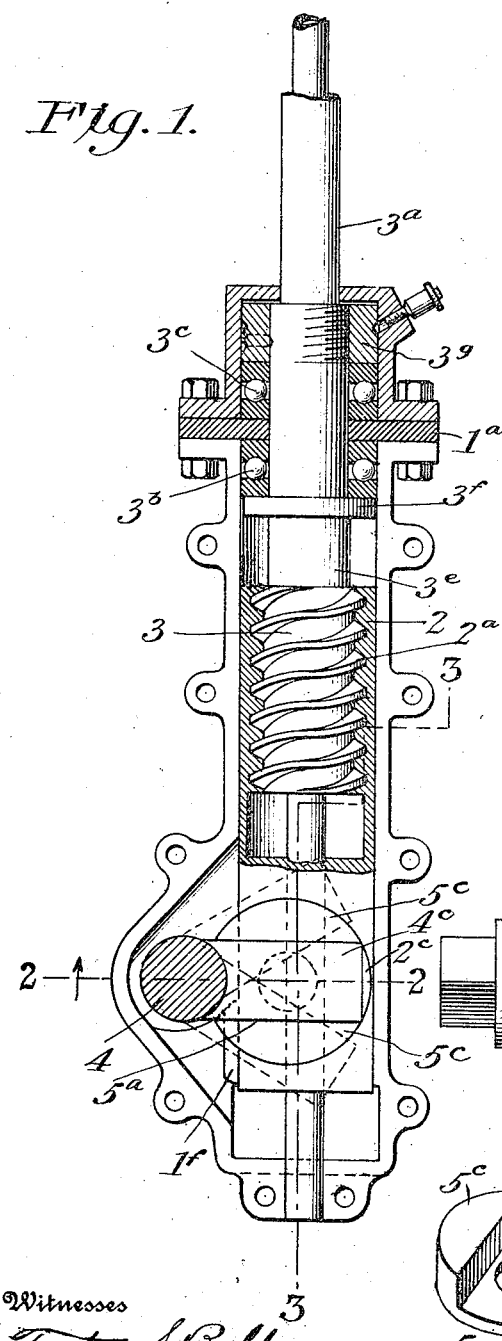
Figure 2:
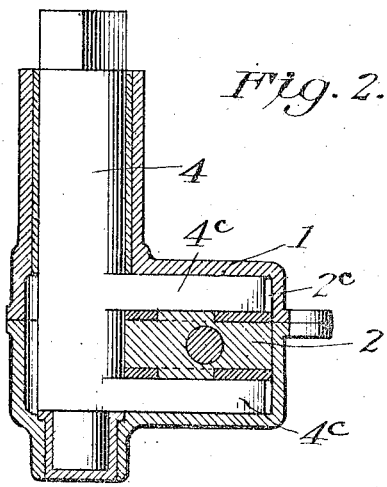
Figure 3:
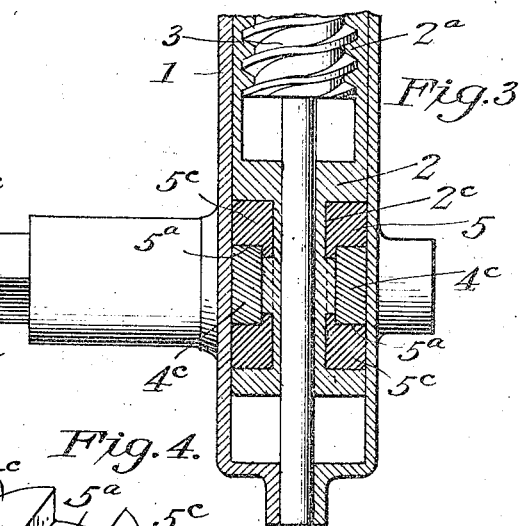

In the accompanying drawings I have illustrated two steering gears embodying the essential feature of the invention, the at present preferred form being illustrated in Figures 1 to 3; and I will explain the invention in detail with reference to said drawings to enable those skilled in the art to construct and use the same; and the claims summarize the invention and subordinate features thereof for which I desire protection.

Figure 4:
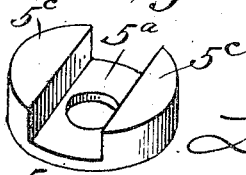

In said drawings—Fig. 1 is a longitudinal section, partly in elevation, through a steering gear; one side of the casing being removed. Fig. 2 is a longitudinal section thereof on line 2—2, Fig. 1. Fig. 3 is a transverse section on line 3—3, Fig. 1. Fig. 4 is a detail view of one of the segment disks. Fig. 5 is a longitudinal section and part elevation with parts broken away of another steering gear embodying the invention. Fig. 6 is a transverse section on line 6—6, Fig. 5. Fig. 7 is a transverse section on line 7—7, Fig. 5.

As shown in Figs. 1 to 3 of the drawings the steering gear comprises a casing 1 in which is mounted a longitudinally movable actuating member 2 which is preferably rectangular in cross section and slidably fitted within a corresponding rectangular portion of the casing, so that said member can move longitudinally of the casing but not rotate therein. This actuating member 2 may be reciprocated by various means; as shown it is provided at one end with an internally screw-threaded portion $2^a$ which is engaged by a worm 3 on a sleeve $3^e$ attached to the lower end of a steering shaft $3^a$, which is held against longitudinal movement in the casing by means of thrust bearings $3^b$, $3^c$, strung on the worm sleeve $3^e$ and located on opposite sides of a bearing plate $1^a$ extending across and secured in the upper part of the casing; a thrust bearing $3^b$ being interposed between the plate $1^a$ and a collar $3^f$ on the worm sleeve; and a thrust bearing $3^c$ being interposed between the plate $1^a$ and a collar $3^g$ secured on the worm sleeve above the plate $1^a$. The worm 3 is thus rotatably, but not longitudinally, movable in the casing; and as a result when the worm is rotated, by turning the steering shaft $3^a$, the actuating member 2 is moved longitudinally of the casing.

In opposite sides of the actuating member 2, below or beyond the end of the worm, are formed cylindrical recesses $2^c$ for a purpose hereinafter explained.

Journaled in the casing at right angles to the worm and member 2, is a rocker shaft 4 to the outer end of which the steering crank or ball arm (not shown) is attached; which steering crank may be connected in any desired manner to the steering wheels of the vehicle, or rudder of the boat, on which the steering gear is used. In the construction shown in Figs. 1–3, this rocker shaft 4 is shown as provided with two parallel radially projecting levers or crank fingers $4^c$ which respectively project into and diametrically of the cylindric recesses $2^c$ in the opposite sides of the member 2; the outer faces of said crank fingers being practically flush with the outer faces of the sides of the member 2 in which the said recesses are formed.

Within each recess $2^c$ is placed a cylindric block or disk 5 that is fitted neatly and rotatably in said recess, and is provided with a diametrical slot $5^a$ in its outer face corresponding in cross section to the cross section of the adjacent crank finger 4ᶜ which latter fits neatly and slidably in said slot 5ᵃ, and the parts 5ᶜ of the disk at each side of said slot form parti-cylindric segments which completely fill the space between the opposite sides of the crank fingers 4ᶜ and the opposed circular walls of the recesses 2ᶜ; the outer face of each segment 5ᶜ being curved on an arc corresponding to that of the circular wall of the recess; and the inner face of each segment is straight to fit neatly and slidably against the straight opposed face of the adjacent crank finger.

It will be observed that the axes of the cylindric recesses 2ᶜ are parallel with the axis of the rocker shaft 4 so that said recesses are in axial parallelism with said shaft; and lie parallel with said shaft instead of standing perpendicular, or at an angle, thereto.

It will be seen that with this construction each parti-cylindric segment 5ᶜ has a large bearing surface both against the wall of the recess in which it is placed and against the opposed crank finger 4ᶜ entering such recess, and such segments effectively prevent lateral play between the crank fingers and the actuating member 2, and at the same time cause the crank fingers to operate the rocker shaft 4 when the actuating member 2 is moved longitudinally. The said segments 5ᶜ and crank fingers 4ᶜ transmit motion in the most advantageous manner from the said actuating member to the rocker shaft 4; the segments 5ᶜ automatically adjusting themselves in the circular recesses as the member 2 is reciprocated; and the crank fingers 4ᶜ readily slipping longitudinally of the segments (or radially of the disks) according to the movement of the member 2. This freedom of movement of the segments 5ᶜ, both relative to the circular walls of the recesses and to the crank fingers 4ᶜ, is an important feature of the invention, as it compensates for any angular changes of position of the segments 5ᶜ relative to the shaft 4, due to the rotation or rocking of disks 5; and also for slippage of the crank fingers 4ᶜ longitudinally of the segments, and radially of the axes of the recesses 2ᶜ; as the shaft 4 is rocked by the movement of the member 2.

I prefer to connect the segments 5ᶜ by forming them as integral parts of a disk as shown, to prevent their possible relative displacement, and to cause the opposed segments to move in exact unison. When so formed each disk 5 may be provided in its web portion, forming the bottom of the slot 5ᵃ, with a circular opening 5ᵉ engaging a corresponding boss or projection 2ᵉ in the center of the recess 2ᶜ, as indicated in Figs. 2 and 3.

In order to prevent the lower end of the actuating member moving laterally toward the shaft 4 when in its extreme positions, a bearing or support 1ᶠ may be provided in the casing against which the adjacent side of the actuating member bears; this support is of such width that the crank fingers will pass on opposite sides of it, and said support is of such length that the lower end of the actuating member will be supported thereby when in either extreme position.

If the segments 5ᶜ are made separate they have a tendency to slip out of the recess if the actuating member 2 is shifted to an extreme position in either direction, and to bind when the actuating member is started back from such extreme position. By connecting the two segments, for instance by a thin web, as indicated in the drawings, they are kept in true relative position; and when, for example, the lower segment is in one extreme position, the opposite segment is entirely entered within the recess, and any tendency of the segments to bind in either extreme position of the actuating member is obviated. The engagement of the web with the boss 2ᵉ also obviates any tendency or possibility of either segment being misplaced or dropping out, if it should project far out of the recess when the actuating member is in either extreme position.

The construction illustrated in Figs. 5, 6 and 7 is substantially similar to that shown in Figs. 1 to 3, but the sliding member 2ˣ (which corresponds in function and effect with member 2 in Figs. 1–3) has its screw-threaded worm-engaging portion formed in a lateral offset 2ʰ so that the screw 3ˣ is at the side of the member 2 instead of at one end thereof. The worm 3ˣ extends through the member 2ˣ and is kept from longitudinal movement in the casing by means of ball thrust bearings 3ᵐ, 3ⁿ, secured in the casing at opposite ends of the worm, as indicated in the drawings. The part 2ᵐ containing the recesses 2ᶜ and segments 5ᶜ may be made integral with the part 2ʰ, or may be made separate therefrom and secured thereto by a stud 2ⁿ engaging a socket in the part 2ʰ adjacent the screw and secured by a ring-nut 2ᵒ, or other suitable device as shown. The segments 5ᶜ, and the rocker shaft 4 and crank fingers 4ᶜ are substantially similar in construction and arrangement to similarly lettered parts in Figs. 1 to 3, and need no further explanation herein.

It will be observed that in each instance the parti-cylindric segments have simply a rotative movement within the recesses; and a sliding contact with the opposed faces of the crank fingers.

It is desirable to have the actuating member, the segments and the rocker shaft and crank fingers made of steel, or hard malleable iron, as they are subjected to severe strains when in actual use.

What I claim is:

1. In combination, a casing, a sliding actuating member therein; means for operating said member; a shaft provided with crank fingers entering circular recesses in opposite sides of said actuating member in axial parallelism with said shaft; and parti-cylindric members in said recesses at opposite sides of said fingers, whereby when the actuating member is operated the shaft is rocked.

2. In combination, a casing, a slidable actuating member therein provided with cylindric recesses in its opposite sides in axial parallelism with the rocker shaft; a screw for reciprocating said actuating member; a rocker shaft beside said actuating member provided with crank fingers entering said recesses; and parti-cylindric blocks in the recesses engaging said crank fingers; whereby the angular motion of said crank fingers relative to the actuating member is compensated for.

3. In combination; a casing; a reciprocating actuating member therein provided with parti-cylindric recesses in its opposite sides in axial parallelism with the rocker shaft; a worm shaft for moving said member longitudinally; a rocker shaft having crank fingers entering said recesses; and parti-cylindric blocks placed in said recesses on opposite sides of said crank fingers; whereby when the actuating member is moved longitudinally said shaft is rocked and the angular motion of the crank fingers relative to said actuating member is automatically compensated for.

4. In combination, a casing, a slidable actuating member therein provided with cylindric recesses in its opposite sides in axial parallelism with the rocker shaft; means for reciprocating said actuating member; a rocker shaft beside said actuating member provided with crank fingers entering said recesses, and rotatable disks in the recesses having opposite parti-cylindric segments engaging said crank fingers; whereby the angular motion of said crank fingers relative to the actuating member is compensated for.

5. In combination; a casing; a reciprocating actuating member therein provided with parti-cylindric recesses in its opposite sides in axial parallelism with the rocker shaft; means for moving said member longitudinally; a rocker shaft having crank fingers entering said recesses; and rotatable disks pivotally mounted in said recesses and having parti-cylindric segments on opposite sides of and engaging said crank fingers; whereby when the actuating member is moved longitudinally said shaft is rocked and the angular motion of the crank fingers relative to said actuating member is automatically compensated for.

6. In combination, a reciprocatory member having a cylindric recess in its outer side axially parallel with the axis of the rocking member, a rocking member having a crank finger extending beside said reciprocatory member and entering said recess; and parti-cylindric segments in said recess filling the spaces between the sides of said crank finger and the outer walls of said recess, substantially as described.

7. In combination, an actuating member having an open ended cylindric recess in its side; means for producing longitudinal motion of said member; a rocker member entering said recess in the actuating member; and parti-cylindric segments in said recess at opposite sides of said rocker member; said segments being rotatable within said recess and slidable relative to said rocker member.

8. In combination, an actuating member having a cylindric recess in its outer side, a rotatable disk provided with parti-cylindric segments on its outer face inserted in said recess; and a rocker lever pivoted at one side of said actuating member and extending into said recess and between the parti-cylindric segments therein, whereby slippage due to angular motion is overcome.

9. In combination, an actuating member having a cylindric recess on each side in axial alinement, parti-cylindric segments in said recesses, and a pair of rocking levers respectively entering one of said recesses and lying between the opposite segments therein, substantially as described.

10. In combination, a casing, a reciprocating actuating member therein provided with cylindric recesses in axial alinement, means for moving said member longitudinally; pivoted members entering said recesses, and parti-cylindric members in said recesses at opposite sides of said pivoted members, whereby when the actuating member is moved longitudinally said pivoted members are rocked.

11. In combination, a casing, a sliding actuating member therein having open ended circular recesses in its opposite sides, means for operating said member; and a shaft provided with crank fingers entering the circular recesses in said actuating member, and a rotatable disk in said recess provided with parti-cylindric members at opposite sides of the finger therein, whereby when the actuating member is operated the shaft is rocked, substantially as described.

In testimony that I claim the foregoing as my own I affix my signature in presence of two witnesses.

DAVID E. ROSS.

Witnesses:
  GEO. C. KUMMING,
  W. B. MATTHEWS.